3,173,952
TRIS-(3,5-DIALKYL-4-HYDROXYBENZYL) AMINES
Martin W. Farrar, Webster Groves, Mo., assignor to
Monsanto Company, a corporation of Delaware
No Drawing. Filed Dec. 24, 1959, Ser. No. 861,741
3 Claims. (Cl. 260—570.9)

This invention relates to new 3,5-dialkyl-4-hydroxybenzyl amines of the structure

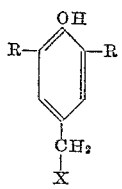

where R is an alkyl radical and X is selected from amino radicals of the structure

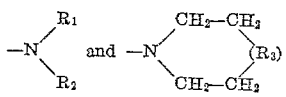

where $R_1$ and $R_2$ are selected from hydrogen, alkyl, cycloalkyl and 3,5-dialkyl-4-hydroxybenzyl radicals, except that not more than one of $R_1$ and $R_2$ can be hydrogen or alkyl and $R_3$ is either an oxygen atom or a methylene radical.

The preparation of the compounds of this invention is illustrated in the following non-limiting examples. Parts are parts by weight unless otherwise stated.

Example 1

To a suitable reaction vessel there is charged 5 parts of cyclohexylamine, 20.6 parts of 2,6-di-tert-butyl phenol and 50 cc. of methanol. To the resulting mixture 9.2 parts of 36% formaldehyde are added dropwise while keeping the reaction mass temperature at about 25° C. After completing the addition of the formaldehyde the reaction mass is refluxed for about 4 hours (during which time the product precipitates) and then cooled and filtered. After washing the filter cake with methanol, it is dried to yield about 18 parts of a yellow crystalline material having a melting point of 100–140° C. Recrystallization of the product from 95% ethanol and then absolute ethanol yields about 12 parts of yellow crystals, having a melting point of about 156–157° C. which product is N-cyclohexyl bis[3,5-di-tert-butyl-4-hydroxybenzyl]amine.

Example 2

In the manner of Example 1, 123.6 parts of 2,6-di-tert-butyl phenol, 63.6 parts of piperidine and 62.4 parts of 36% formaldehyde are used to prepare about 154 parts of N - [3,5-di-tert-butyl-4-hydroxybenzyl)piperidine, a light tan crystalline material having a melting point of 73–74° C.

Example 3

In the manner of Example 1, 43 parts of N-octyl 3,5-di-tert-butyl-4-hydroxybenzyl amine is prepared from 20.6 parts of 2,6-di-tert-butyl phenol, 12.9 parts of octyl amine and 20.8 parts of 36% formaldehyde. The product is obtained as yellow crystals.

Example 4

To a suitable reaction vessel is added 43.5 parts of cyclohexyl amine, 60 cc. of methanol and 36.8 parts of 36% formaldehyde while keeping the temperature of the mass at 25–30° C. Thereafter a solution of 82.4 parts of 2,6-di-tert-butyl phenol in 150 cc. of methanol is added over a period of about 100 minutes. After refluxing for several hours, the reaction mass is cooled to room temperature, filtered, extracted with diethylether, washed with water and dried over magnesium sulfate. The diethylether is then removed and the product crystallized from Skelly B at about 0° C. The product is then recrystallized from a mixture of acetone and Skelly B to yield 72 parts of N-cyclohexyl 3,5-di-tert-butyl-4-hydroxybenzyl amine having a melting point of 84°–85° C. This particular compound was also found to be a contact herbicide for broadleaf plants and crab grass at concentrations of 0.1 to 1.0%.

Example 5

To a suitable reaction vessel there is charged 41.6 parts of 2,6-di-tert-butyl phenol, 8 parts of n-butylamine and 50 cc. of methanol. The resulting mixture is added dropwise 18.4 parts of 36% formaldehyde while maintaining the temperature at 25°–30° C. Thereafter the reaction mixture is refluxed for about 2 hours, cooled at 0° C. and filtered. After the filter cake is washed with cold methanol and dried under vacuum there is obtained about 45.2 parts of a yellow crystalline material. After recrystallizing and drying the above obtained material there remains about 32 parts of N-n-butyl bis[3,5-di-tert-butyl-4-hydroxybenzyl]amine, light yellow crystals melting at 125°–126° C.

Example 6

In the manner of Example 1, 20.6 parts of 2,6-di-tert-butylphenol, 8.7 parts of morpholine dissolved in 50 cc. of methanol is reacted with 8.4 parts of 36% formaldehyde to yield about 14 parts of N-[3,5-di-tert-butyl-4-hydroxybenzyl]morpholine which melts at 91°–92° C.

Example 7

In the manner of Example 1, 18.5 parts of 2,6-di-tert-butyl phenol and 0.68 part of ammonia (2.3 cc. of 27% ammonia) in 35 cc. of methanol are reacted with 8.8 parts of 36% formaldehyde to produce about 4.5 parts of tris (3,5-di-tert-butyl-4-hydroxybenzyl)amine, a white fluffy crystalline material melting at 235°–237° C.

Example 8

In the manner of Example 1, 26.7 parts of 2,6-di-isopropyl phenol and 3.4 parts of 28% ammonia, dissolved in 40 cc. of methanol, are reacted with 13.6 parts of 36% formaldehyde to produce 23.2 parts of a white crystalline material melting at 154°–156° C. which is tri(3,5-di-isopropyl-4-hydroxybenzyl)amine.

Example 9

In the manner of Example 1, dicyclohexylamine (18.6 parts) and 2,6-di-tert-butyl phenol (20.6 parts) in 40 cc. of methanol are reacted with formaldehyde (9.2 parts of 36% material) to produce N,N-dicyclohexyl-3,5-di-tert-butyl-4-hydroxybenzyl amine (about 14 parts) a white crystalline material melting at 100–101° C.

Other similar compounds as previously defined are prepared in a manner similar to the procedures given above. Thus from the above it is seen that the starting phenol can be any 2,6-dialkylphenol such as 2,6-dimethyl phenol, 2,6-diethylphenol, 2,6-di-n-propyl phenol, 2,6-di-n-butylphenol, 2,6-diamyl phenol, 2,6-dihexylphenol, 2,6-dioctyl phenol and the like. Also amines other than those used above can be reacted to provide the amines of this invention. Examples of suitable amines are ethyl amine, propyl amine, hexyl amine, decyl amine, tridecyl amine and the like.

The compounds of this invention are particularly effective anti-exposure cracking agents (anti-ozonants) for natural rubber goods. As illustrative of the anti-exposure cracking properties in natural rubber vulcanizates of the new compounds of this invention, the following compositions were prepared.

| Stock | A | B | C |
|---|---|---|---|
| | Parts by Weight | | |
| Smoked sheets rubber | 100 | 100 | 100 |
| Carbon black | 50 | 50 | 50 |
| Saturated hydrocarbon softener | 3 | 3 | 3 |
| Zinc oxide | 5 | 5 | 5 |
| Stearic acid | 3 | 3 | 3 |
| Sulfur | 2.5 | 2.5 | 2.5 |
| N-cyclohexyl-2-benzothiazole sulfenamide | 0.5 | 0.5 | 0.5 |
| 6-Ethoxy-1,2-dihydro-2,2,4-trimethylquinoline [1] | 1.5 | | |
| N-[3,5-di-tert-butyl-4-hydroxybenzyl]piperidine | | 1.5 | |
| Tris(3,5-di-isopropyl-4-hydroxy-benzyl)amine | | | 1.5 |

[1] This compound is a well known anti-exposure cracking agent.

The ingredients were mixed on a rubber mill in customary fashion and the respective compounded stocks cured in a press at 142° C. for 30 minutes. The vulcanized compositions were then evaluated under dynamic conditions in an atmosphere in which the ozone concentration was maintained at 20–30 parts per hundred million. Samples of the stocks were cured in the form of a belt ½" wide, ¼" thick and 5⅚" diameter and mounted on 1" diameter shafts. By rotating the shafts at 75 r.p.m. a momentary elongation through a range of 0–20% is provided at any position of the test sample passing over the shaft. The test samples were compared visually and the extent of cracking noted. The results observed from the tests are set forth below, Stock A being given a rating of 100.

Stock: Relative resistance to cracking after flexing in ozone
- A ——————————————————— 100
- B ——————————————————— 119
- C ——————————————————— 100

Although 1.5 parts of the anti-exposure cracking agents of this invention were used per 100 parts of smoked sheets rubber in order to demonstrate the effectiveness of these compounds it is to be understood that the invention is not limited thereto. Thus any small, though substantial, amount can be employed, and this can vary, for example, from 0.2 part by weight to 10 parts by weight depending upon the use to be made of the rubber composition.

Other modes of applying the principles of this invention will be apparent to those skilled in the art. Accordingly, while this invention has been described by reference to various specific examples and embodiments, it is to be understood that the invention is not limited thereto and that it can be variously practiced within the scope of the following claims.

What is claimed is:

1. A compound of the structure

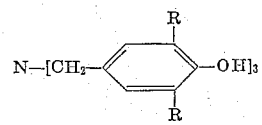

where R is alkyl.

2. Tris-(3,5-di-tert-butyl-4-hydroxybenzyl)amine.
3. Tris-(3,5-di-isopropyl-4-hydroxybenzyl)amine.

References Cited in the file of this patent

UNITED STATES PATENTS

| | | |
|---|---|---|
| 2,033,092 | Bruson | Mar. 3, 1936 |
| 2,036,916 | Bruson | Apr. 7, 1936 |
| 2,181,719 | Baird et al. | Nov. 28, 1939 |
| 2,262,720 | Earle | Nov. 11, 1941 |
| 2,363,134 | McCleary | Nov. 21, 1944 |
| 2,406,722 | Vincent | Aug. 27, 1946 |
| 2,589,205 | Pohland | Mar. 11, 1952 |
| 2,783,277 | Hiltmann | Feb. 26, 1957 |
| 2,784,138 | Wegler et al. | Mar. 5, 1957 |
| 2,816,945 | Beaver | Dec. 17, 1957 |
| 2,842,595 | Rigterink | July 8, 1958 |
| 2,868,844 | Coffield | Jan. 13, 1959 |
| 2,962,531 | Coffield | Nov. 29, 1960 |
| 3,001,999 | Geschickter et al. | Sept. 26, 1961 |

FOREIGN PATENTS

| | | |
|---|---|---|
| 713,806 | Great Britain | Aug. 18, 1954 |
| 771,022 | Great Britain | Mar. 27, 1957 |
| 806,961 | Great Britain | Jan. 7, 1959 |

OTHER REFERENCES

Igonin et al.: "Doklady Akad. Nauk, S.S.S.R.," vol. 121, 625–5 (1958).

Zigeuner et al.: "Monatsh," vol. 90, pages 232–8 (1959).